United States Patent [19]
Stephens et al.

[11] Patent Number: 5,751,529
[45] Date of Patent: May 12, 1998

[54] MAGNETIC HEAD PROTECTION FOR A CARTRIDGE TAPE DRIVE

[75] Inventors: Fred O. Stephens, Loveland; Jonathan D. Bassett, Fort Collins, both of Colo.

[73] Assignee: Hewlett-Packard Company, Palo Alto, Calif.

[21] Appl. No.: 810,096

[22] Filed: Mar. 3, 1997

Related U.S. Application Data

[63] Continuation of Ser. No. 493,128, Jun. 21, 1995, abandoned.
[51] Int. Cl.$^6$ .................. G11B 15/00; G11B 5/10
[52] U.S. Cl. .......................... 360/128; 360/96.5
[58] Field of Search .................. 360/83, 88, 90, 360/93, 96.1, 96.5, 96.6, 106, 107, 109, 128

[56] References Cited

U.S. PATENT DOCUMENTS

| | | | |
|---|---|---|---|
| 4,498,112 | 2/1985 | Georgeus et al. | 360/96.5 |
| 4,807,067 | 2/1989 | Spiegelstein | 360/96.5 |
| 5,025,334 | 6/1991 | Perona et al. | 360/96.5 |

FOREIGN PATENT DOCUMENTS

| | | | |
|---|---|---|---|
| 1-182913 | 7/1989 | Japan . | |
| 2-54433 | 2/1990 | Japan | 369/44.14 |
| 2-152053 | 6/1990 | Japan . | |

*Primary Examiner*—Stuart S. Levy
*Assistant Examiner*—David L. Ometz
*Attorney, Agent, or Firm*—Augustus W. Winfield

[57] ABSTRACT

A tape drive having a protection barrier to keep improperly inserted tape cartridges from damaging the read/write head. In a first embodiment of the invention, a short protection wall is positioned in front of the read/write head. This protection wall prevents a tape cartridge inserted sideways into the tape drive from contacting the read/write head. The protection wall also prevents a partially opened cartridge door from striking the read/write head. In a second and third embodiment of the invention, one or more protection pins are used to protect the read/write head. These protection pins also keep a cartridge inserted sideways into the tape drive or a cartridge door partially opened from striking the read/write head.

5 Claims, 12 Drawing Sheets

MAGNETIC HEAD PROTECTION FOR A CARTRIDGE TAPE DRIVE

CROSS REFERENCE TO RELATED APPLICATION

This is a continuation of application Ser. No. 08/493,128 filed on Jun. 21, 1995 now abandoned.

FIELD OF THE INVENTION

This invention relates to magnetic tape drives. In particular this invention relates to a means for protecting the read/write head from damage in the event a tape cartridge is improperly inserted into the tape drive.

BACKGROUND OF THE INVENTION

Tape cartridge drives have become very popular in the computer industry. Common uses for which these tape drives have been used include the distribution of software and for use in backing up software resident on a hard disk. While excellent for these and other uses, the tape drive and cartridge tape interface has presented problems for users.

One major recurring problem relates to the tape cartridge being inserted into the tape drive improperly. The tape cartridge is of uniform thickness and it is wider than deep. Therefore the cartridge can be inserted into the tape drive sideways. Although the drive will not run in this condition, the aluminum baseplate of the tape cartridge can scratch the drive read/write head. This necessitates the return of the tape drive to a repair center for the replacement and alignment of the tape head.

Another recurring problem relates to tape cartridges which have movable doors to protect the tape. For example, if a Travan tape cartridge is inserted into a tape drive at a very fast rate of speed, the inertia of the door can cause the door opener to not operate adequately. This situation leads to the unopened or partially opened cartridge door hitting the read/write head. Again the tape drive will be damaged and must be returned to a repair center.

What is needed in the industry is a means for preventing an improperly inserted tape cartridge from damaging the tape drive read/write head and which is low in cost and effective.

SUMMARY OF THE INVENTION

The present invention is a low cost and effective means to prevent a tape cartridge incorrectly positioned within a tape drive from harming the tape drive read/write head. In a first preferred embodiment, a short protection wall is constructed within the tape drive which prevents a tape cartridge inserted sideways into the tape drive from contacting the read/write head. This protection wall is also effective in preventing a partially open cartridge door from striking the read/write head.

The protection wall is designed to extend upwardly from the bottom surface inside the tape drive such that it is tall enough to keep the cartridge door from striking the read/write head if the door is not fully open. Also the protection wall is designed to be short enough such that the wall does not interfere with the read/write head to tape surface interface when the cartridge is properly inserted into the drive. The protection wall is constructed robustly to enable the wall to stop a cartridge inserted sideways into the tape drive from striking the read/write head.

In a second preferred embodiment, two pins replace the protection wall. The two pins block a cartridge inserted sideways from striking the read/write head. Additionally, they are positioned to keep the cartridge door from striking the read/write head if the door is not fully open. As with the wall, the pins are sized so as to not interfere with the read/write head to tape surface interface when the cartridge is properly inserted into the tape drive.

In a third preferred embodiment, a single pin is utilized to block an improperly inserted cartridge from striking the read/write head and to keep a partially opened cartridge door from contacting the head.

These embodiments share the advantages of low cost implementation and of being highly effective in preventing damage to the tape drive due to an incorrectly positioned cartridge.

DETAILED DESCRIPTION OF THE INVENTION

Figure 1:
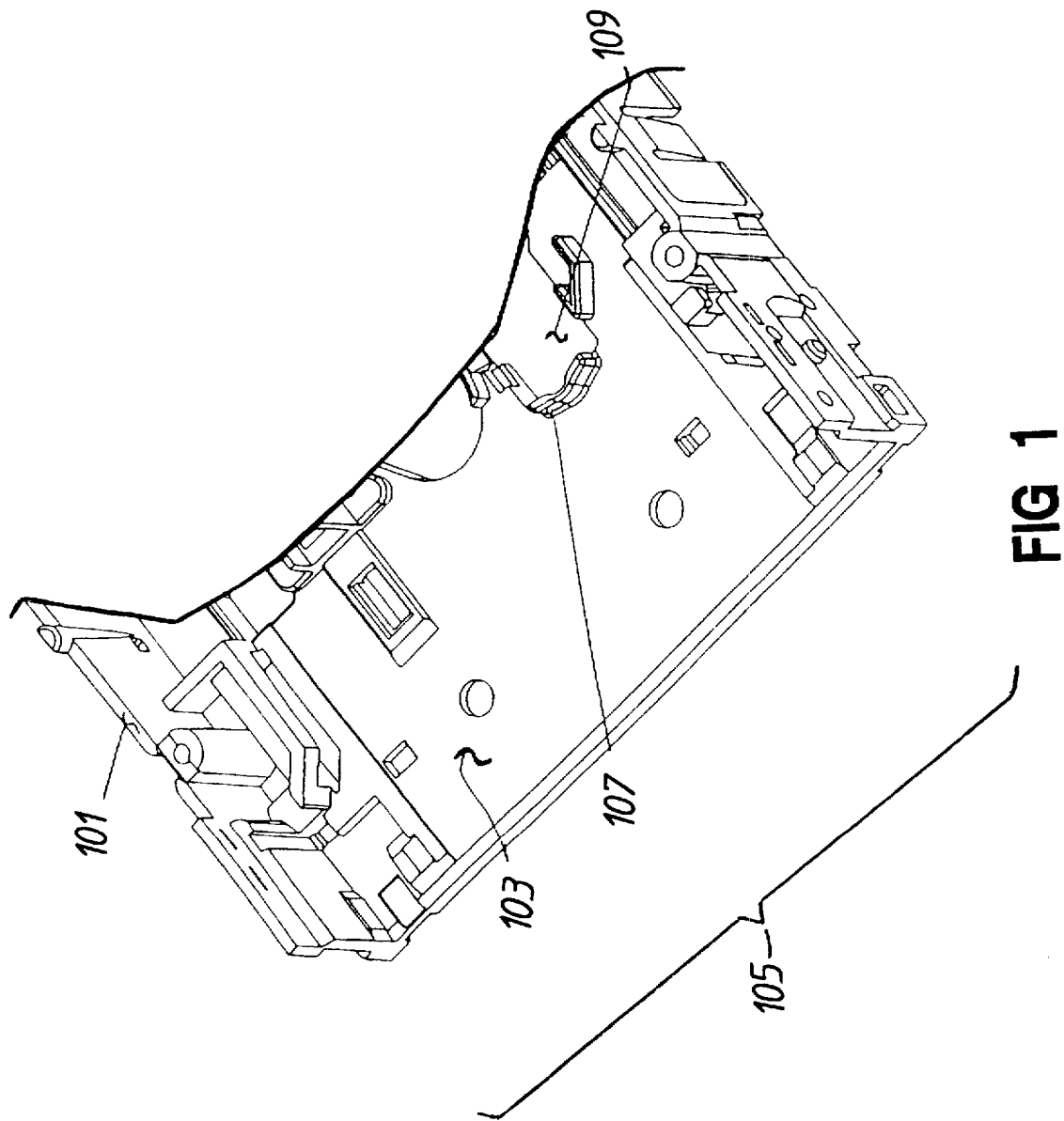
FIG. 1 is a top view of a bare tape drive chassis incorporating a protection wall.

FIG. 1 illustrates a protection wall according to the first preferred embodiment of the present invention. A tape drive chassis 101 is shown having a bottom surface 103 and a tape cartridge insertion opening 105. Mounted to the bottom surface 103 is a protection wall 107 located in front of a read/write head travel clearance aperture 109.

The protection wall 107 is mounted to the bottom surface 103 using standard fastening means or preferably it is formed as an integral part of the bottom surface 103. This forming can be by molding, casting or other process suitable for the material used to form the bottom surface 103. The wall extends upward as far as possible without interfering with the bottom edge of the tape media in the tape cartridge. Typically, the wall is approximately 135 thousandths of an inch high from the bottom surface 103.

Figure 2:
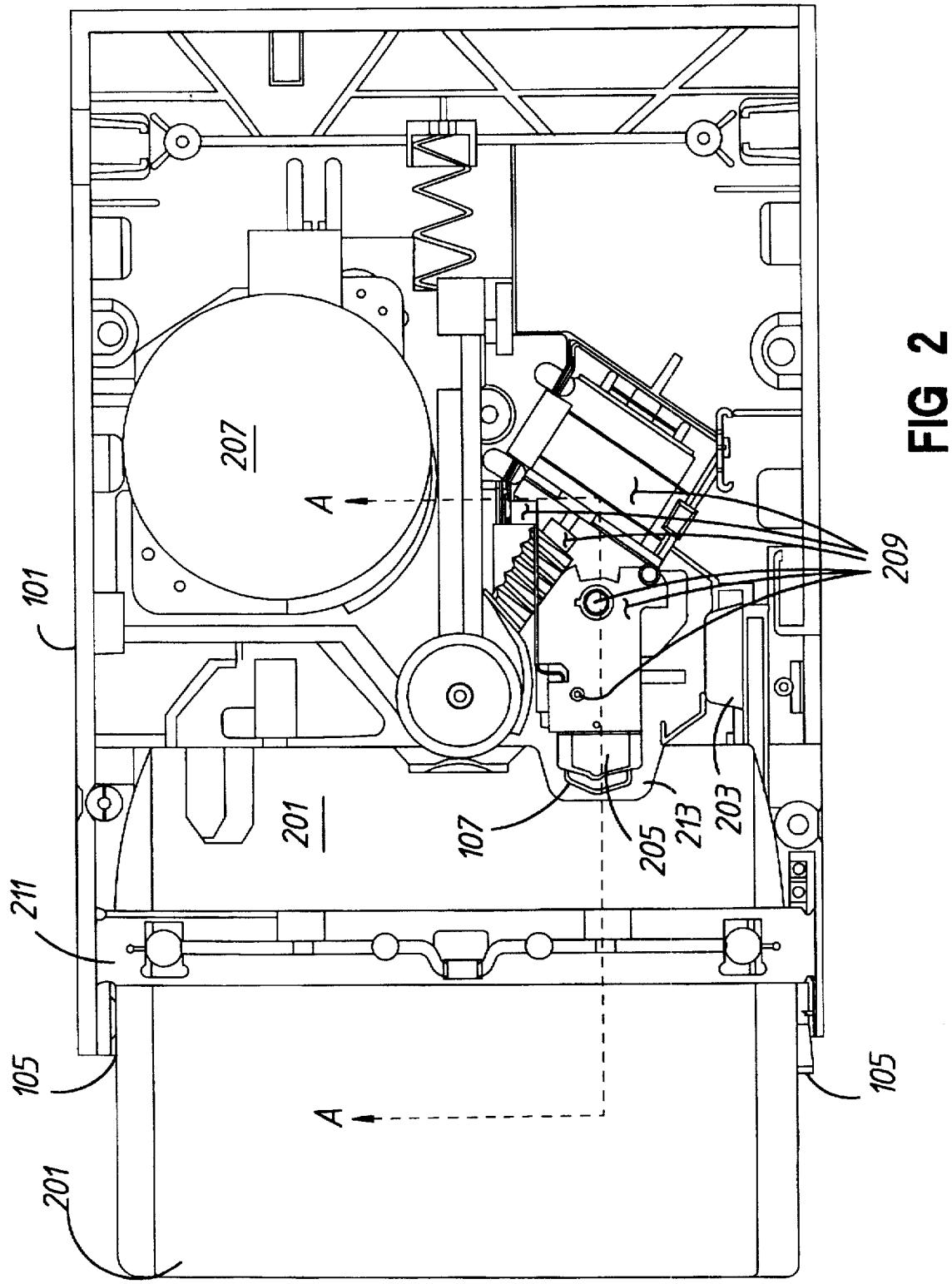
FIG. 2 is a top view of a partially populated tape drive detailing internal mechanisms.

FIG. 2 illustrates a partially assembled tape drive chassis 101 having a tape cartridge 201 inserted through the tape cartridge insertion opening 105. The tape cartridge 201 is shown with the cartridge door 203 in the fully open position. A read/write head 205 is operationally positioned to engage the surface of the tape (not shown) inside the tape cartridge. The read/write head is able to move up and down behind the protection wall so that it can access different portions (tracks) of the tape media. A tape transport system 207, a number of read/write head motion system components 209 and a cartridge latch arm 211 are also illustrated.

The protection wall 107 is constructed so as to not interfere with the read/write head movement and therefore the read/write head can engage the tape inside the tape cartridge. This protection wall 107 is situated on the bottom surface so that when the data cartridge 201 is inserted into the drive as illustrated, the protection wall fits within the notch 213 which is integral to the tape cartridge.

Figure 3:
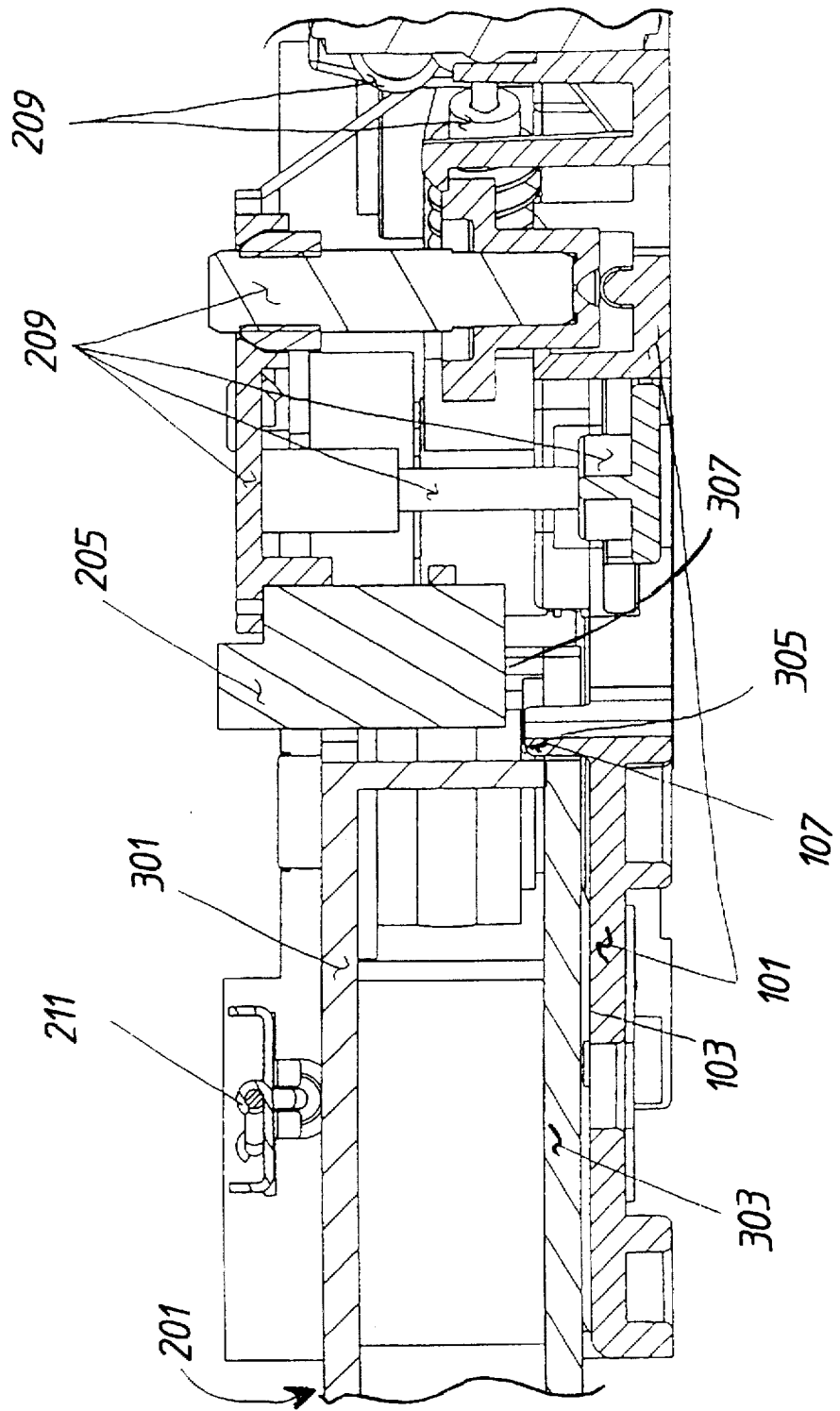
FIG. 3 is a sectional view of the tape drive illustrated in FIG. 2.

FIG. 3 is a sectional view taken along section lines A—A of FIG. 2. The tape cartridge 201 is constructed with a plastic cover 301 and an aluminum baseplate 303 as is known in the industry. The protection wall 107 is shown as an integral part of the bottom 103 of the chassis 101. The height of the protection wall 107 is such that the top of the wall 305 is higher than the cartridge baseplate 303 and slightly higher than the bottom edge of the cartridge door 203 (shown in FIG. 2). The wall is also below the bottom edge of the tape media so as not to interfere with the head to tape interface.

Figure 4:
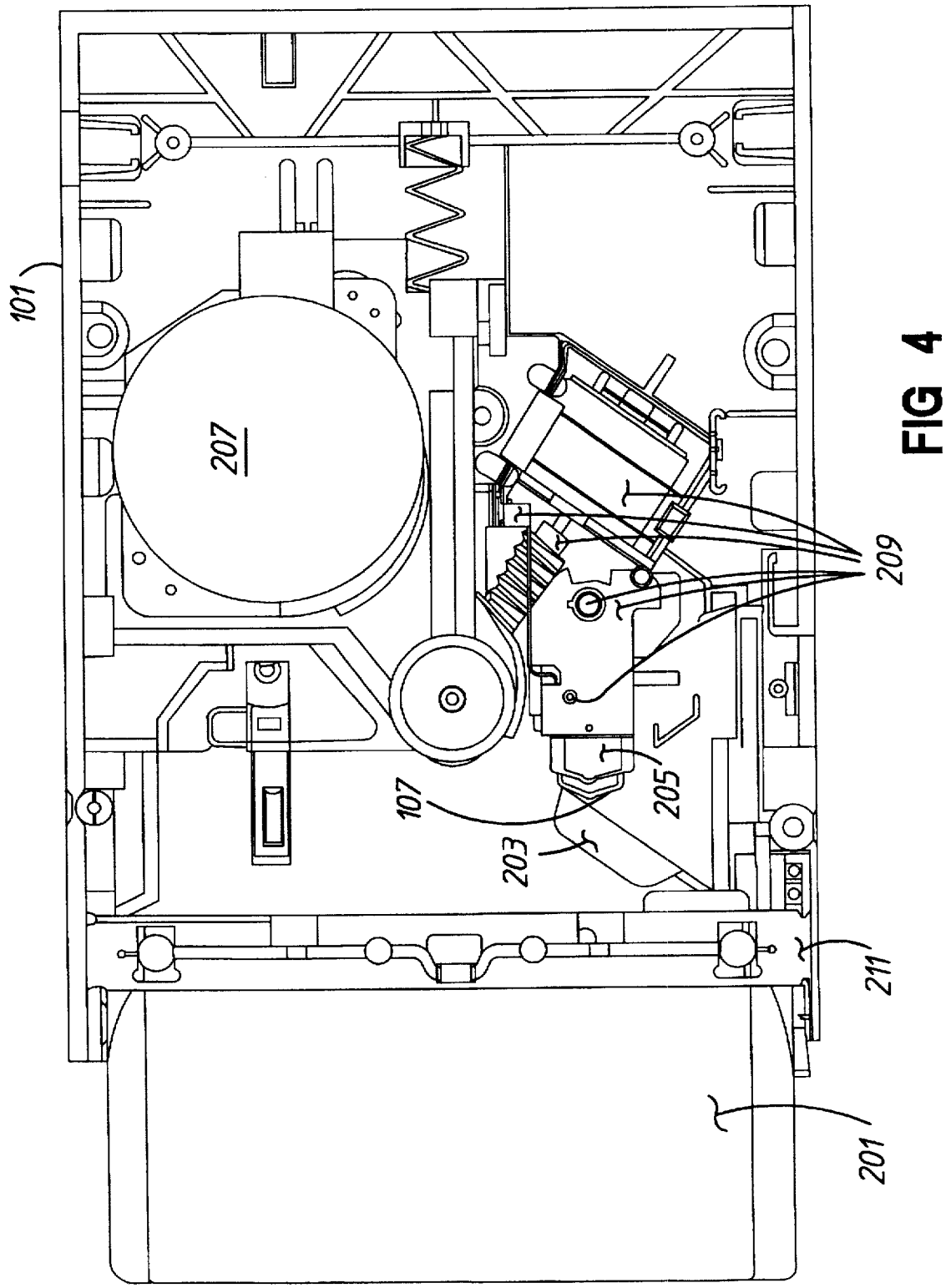
FIG. 4 illustrates a partially opened cartridge door being blocked by a protection wall.

FIG. 4 illustrates a tape cartridge 201 inserted into the tape drive with the cartridge door 203 not fully open. The cartridge door 203 hits against the protection wall 107 and is thereby prevented from striking the read/write head 205. The tape cartridge cannot be inserted significantly further than shown if the cartridge door is not fully open. This process keeps any part of the tape cartridge from striking the read/write head and causing damage to the head.

Figure 5:
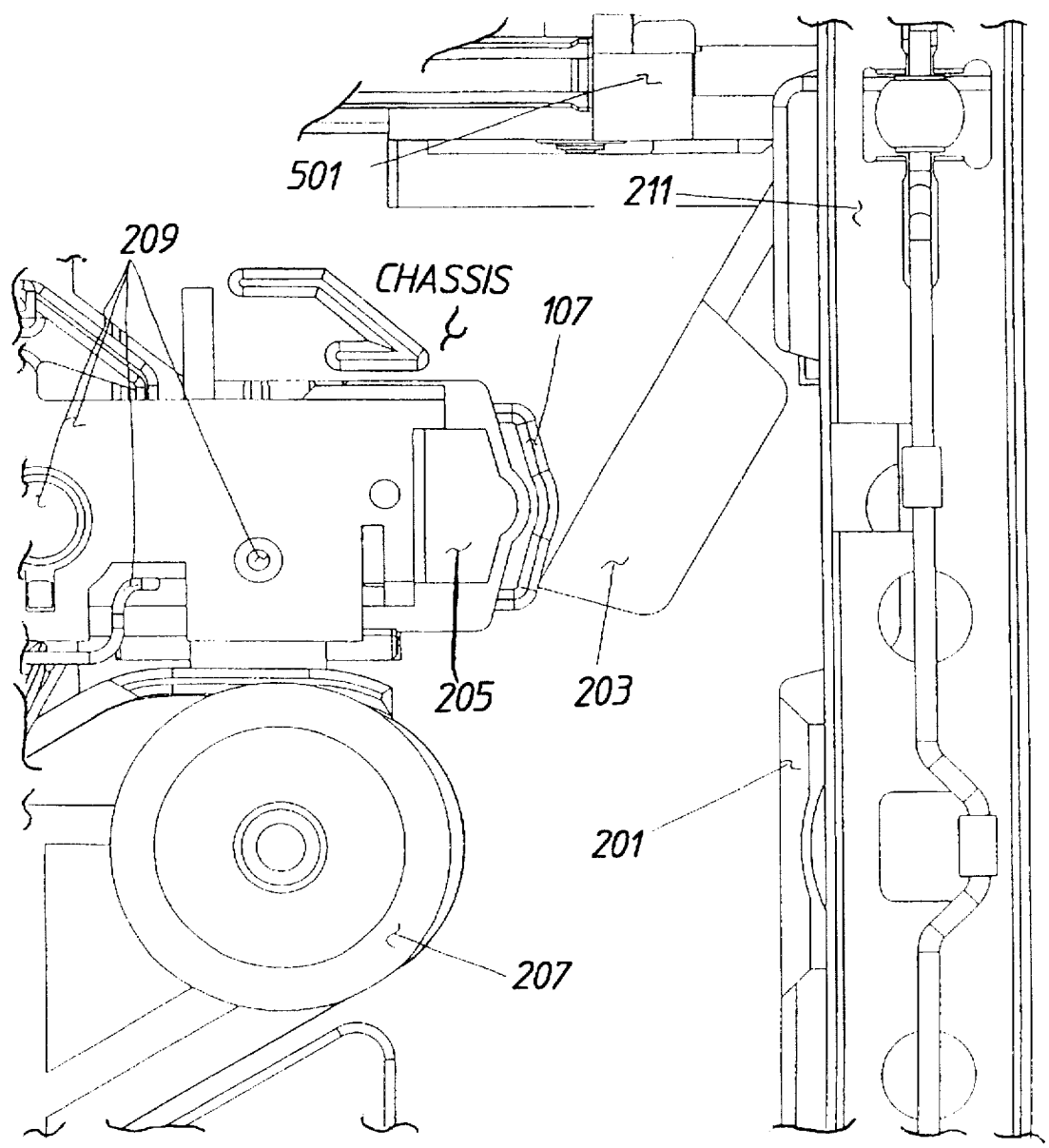
FIG. 5 is a close up view of the read/write head area of FIG. 4.

FIG. 5 is a close up view of the read/write head area illustrated in FIG. 4. As described in association with FIG. 4, the tape cartridge door 203 is not properly positioned (fully open) and the bottom edge of the cartridge door hits the protection wall 107. The positioning of the protection wall 107 in front of the read/write head 205 keeps the cartridge door from striking the read/write head. Part of the door opening system 501 and a chassis rail 503 are also illustrated.

Figure 6:
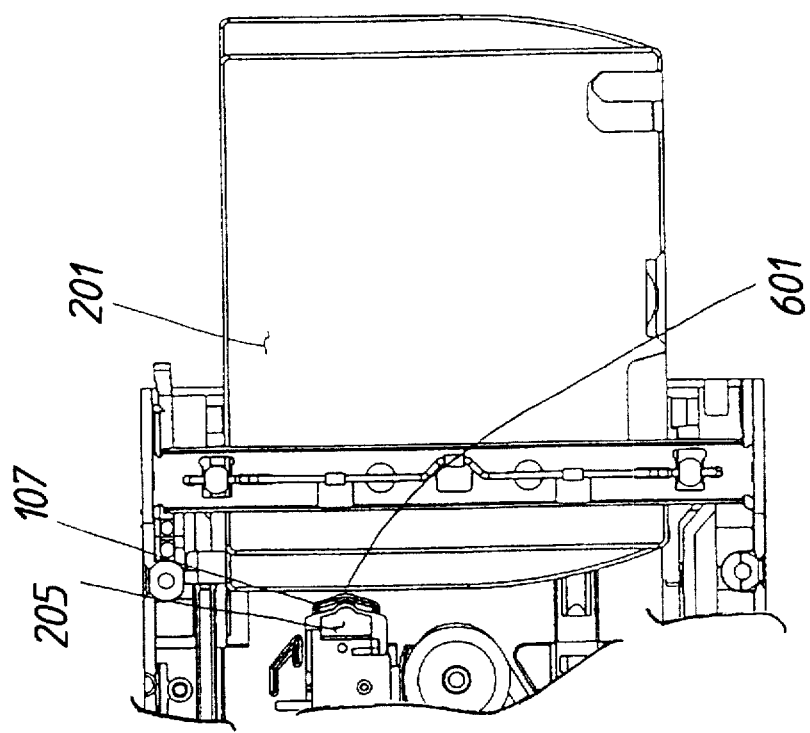
FIG. 6 illustrates a tape cartridge inserted sideways into a tape drive.

FIG. 6 illustrates the tape cartridge 201 being inserted into the tape drive sideways. Positioned in this manner, the leading side edge 601 of the tape cartridge strikes the protection wall 107. The protection wall prevents the tape cartridge from being inserted further into the tape drive and thereby prevents any part of the tape cartridge from striking the read/write head 205. An upper guide may be necessary in the drive to prevent the tape cartridge from being inserted above the wall if the cartridge does not engage the chassis rail 503.

Figure 7:
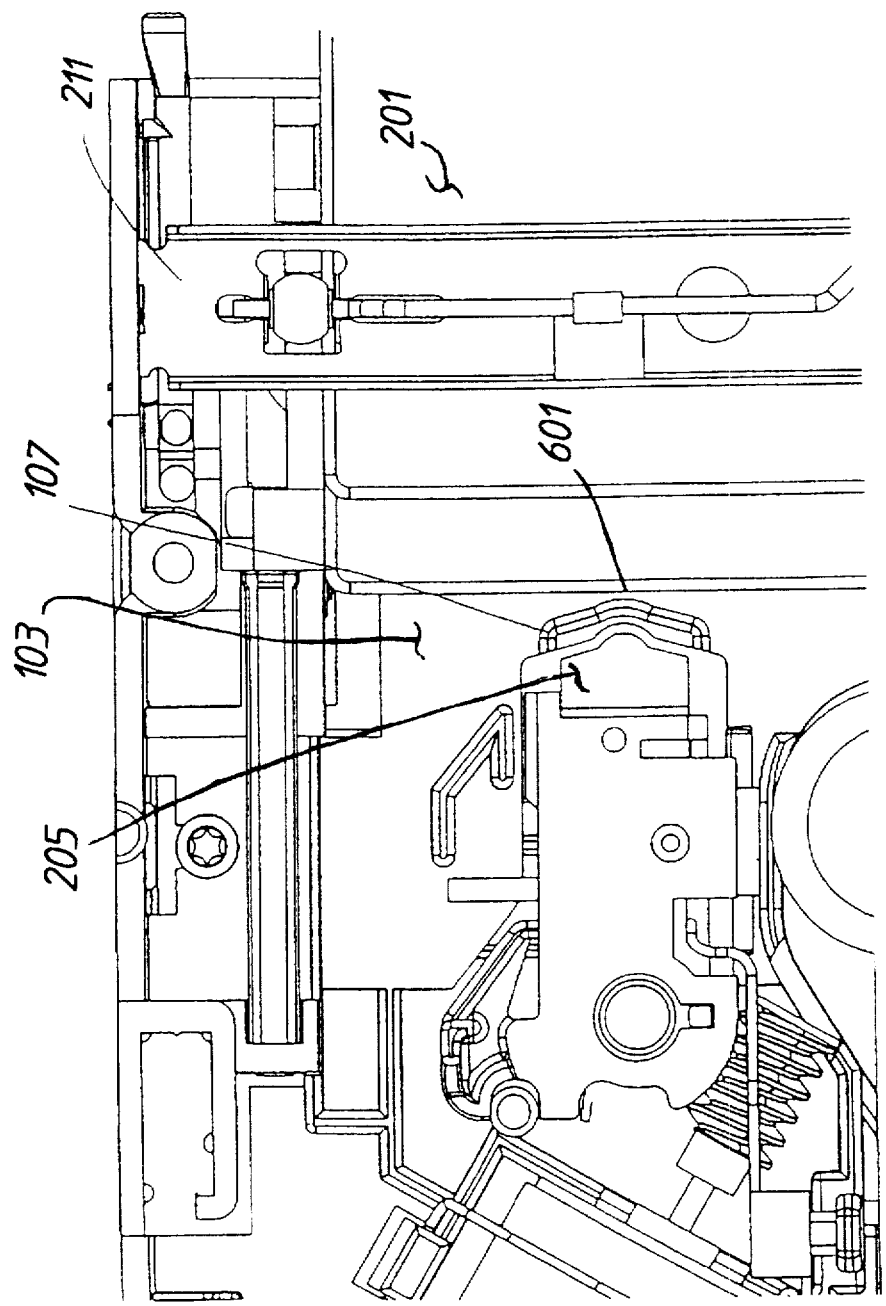
FIG. 7 is a close up view of the read/write head area of FIG. 6.

FIG. 7 is a close up view of the read/write head area illustrated in FIG. 6. As described in association with FIG. 6, the leading side edge 601 of the tape cartridge strikes the protection wall 107. This action prevents the read/write head 205 from being damaged by a sideways inserted tape cartridge.

Figure 8:
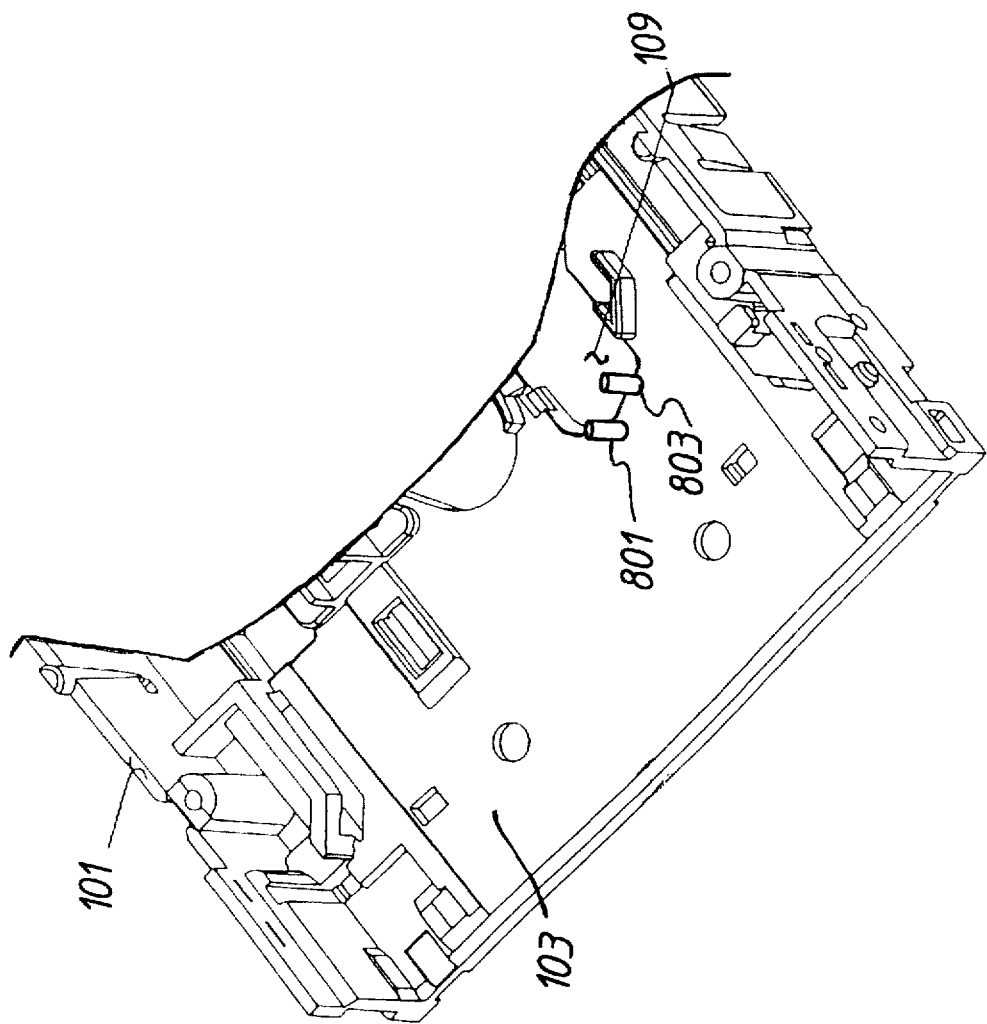
FIG. 8 is a top view of a bare tape drive chassis incorporating protection pins.

FIG. 8 illustrates a second preferred embodiment of the present invention. The protection wall 107 shown in FIG. 1 is replaced by two protection protrusions 801 and 803. These protrusions are illustrated as round pins but may be any suitably shaped protrusions. These two pins perform the same functions as the protection wall. That is, they prevent a sideways inserted tape cartridge from contacting the read/write head and prevent the cartridge door from striking the read/write head if the door is not opened properly. Like the protection wall, the pins are sized to protect the read/write head without interfering with the operation of the read/write head. The upper surface of the pins are below the bottom edge of the tape media and are approximately 135 thousandths of an inch high measured from the bottom surface 103 of the tape drive. The pins are also positioned to fit within the notch 213 (shown in FIG. 2) of a properly inserted tape cartridge.

Figure 9:
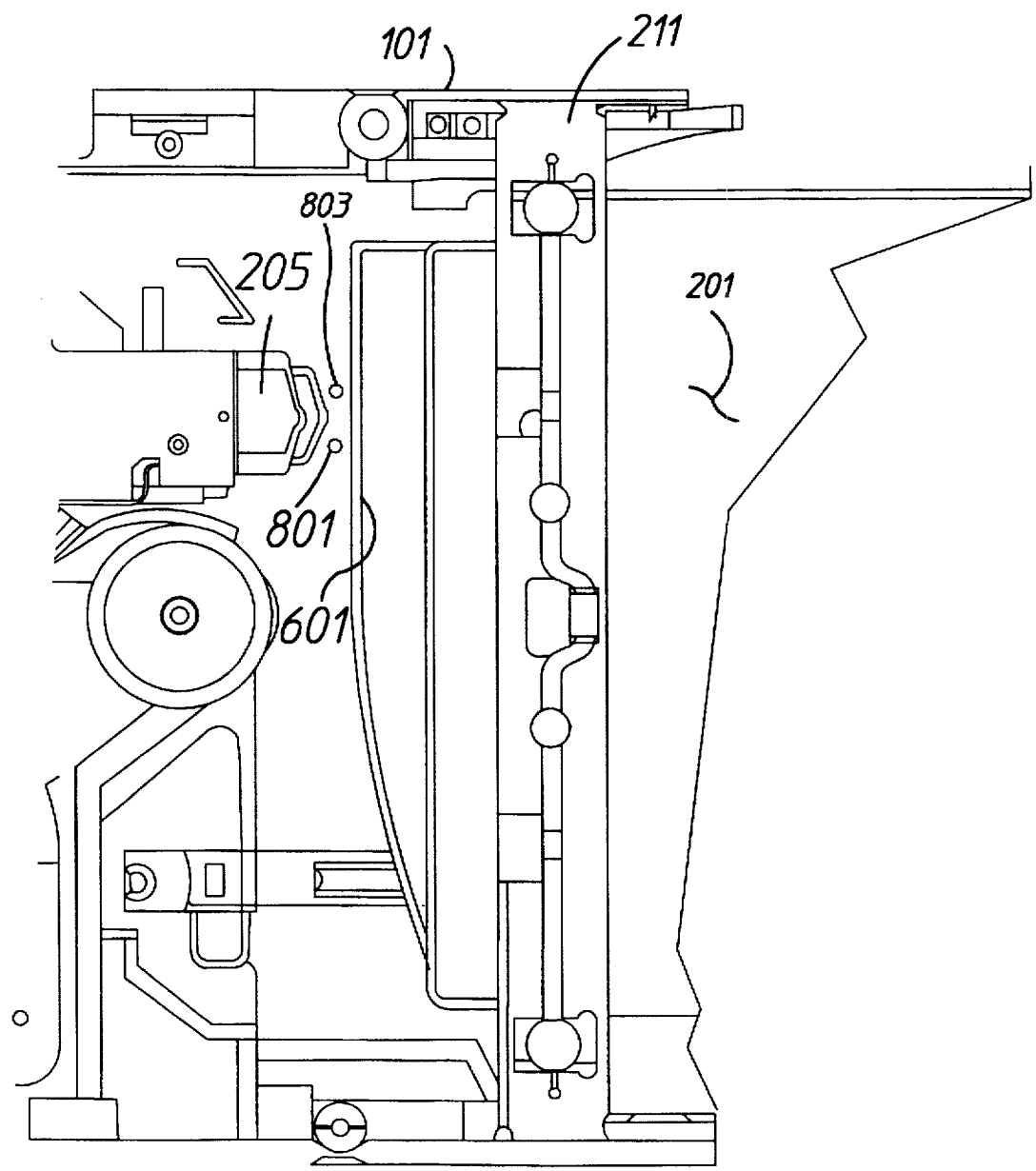
FIG. 9 is a close up view of the read/write head area of FIG. 8.

FIG. 9 is a close up of the read/write head area illustrated in FIG. 8. The two protection pins 801 and 803 prevent the leading side edge 601 of the cartridge from striking the read/write head 205. Protection pin 801 will also prevent a partially open cartridge door (not shown) from striking the read/write head in similar manner as illustrated in FIG. 5.

Figure 10:
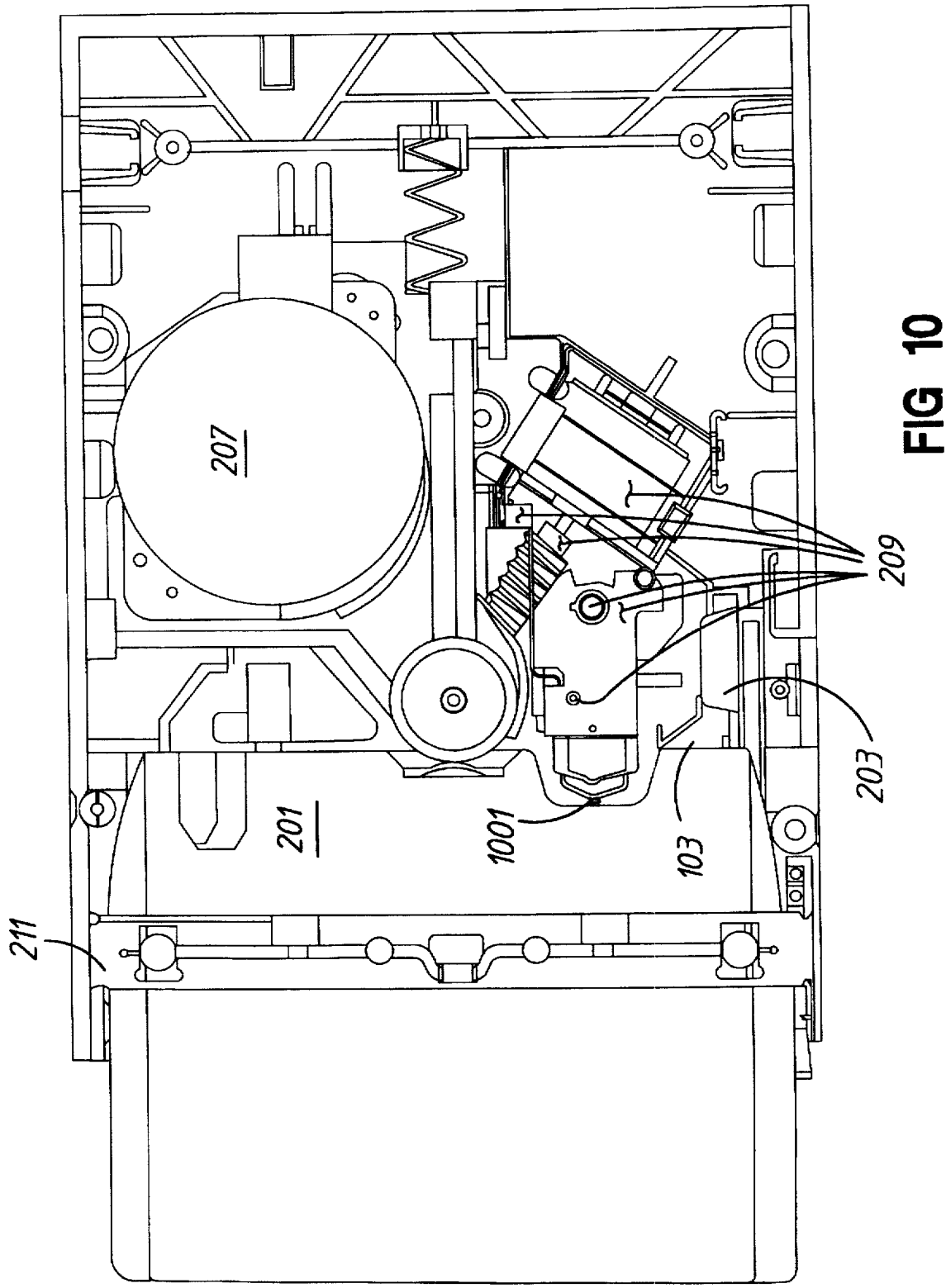
FIG. 10 is a top view of a tape drive incorporating a protection pin.

FIG. 10 illustrates a third preferred embodiment of the present invention. In this embodiment a single protection pin 1001 is utilized to prevent a sideways inserted tape cartridge from contacting the read/write head and prevent the cartridge door from striking the read/write head if the door is not opened properly. The upper surface of the pin is below the bottom edge of the tape media and is approximately 135 thousandths of an inch from the bottom surface 103. The pin is positioned to fit within the cartridge notch 213 (shown in FIG. 2) of a properly inserted tape cartridge.

Figure 11:
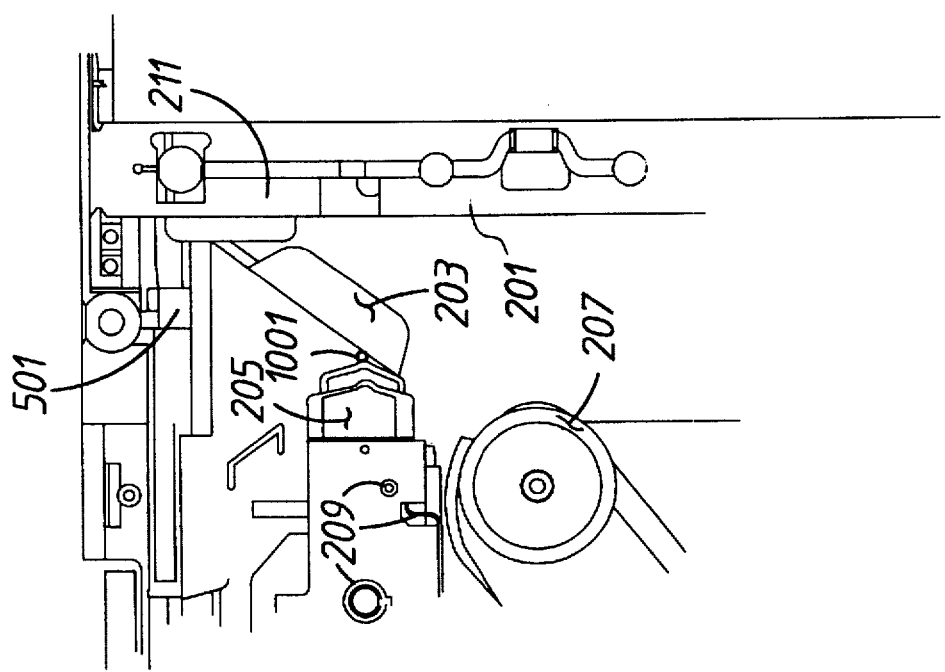
FIG. 11 is a close up view of the read/write head area of FIG. 10.

FIG. 11 is a close up of the read/write area illustrated in FIG. 10. The protection pin 1001 keeps the cartridge door 203 from striking the read/write head 205. As previously discussed, the protection pin 1001 is positioned such that a tape cartridge inserted into the tape drive sideways will not strike the read/write head.

Figure 12:
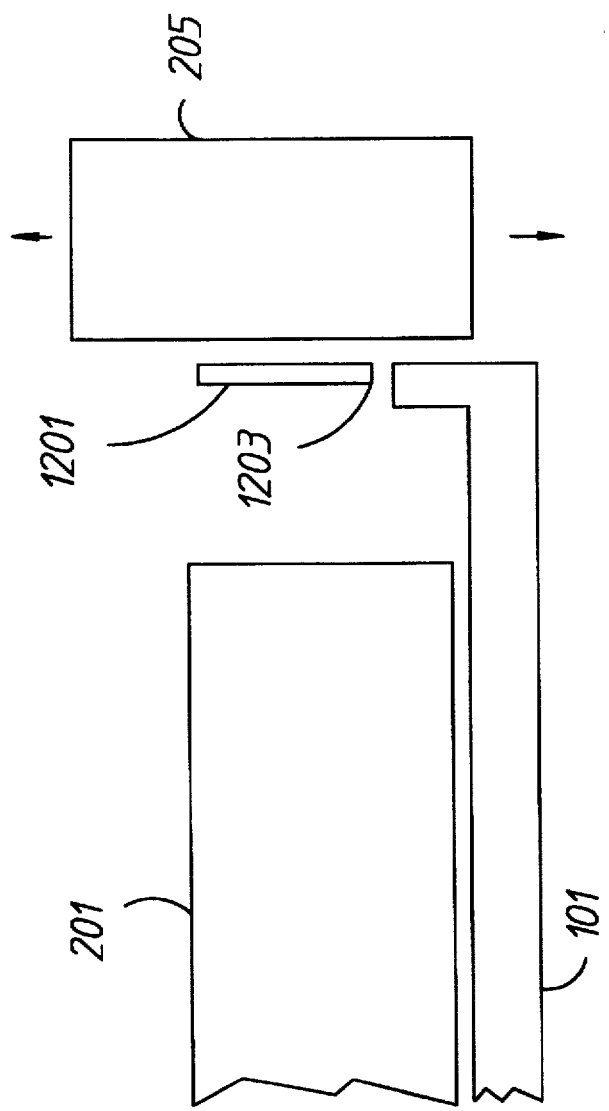
FIG. 12 is a side sectional view of a tape drive according to the present invention.

FIG. 12 is an exaggerated side sectional view of a tape drive having a protective barrier in front of the read/write head. As illustrated, the read/write head 205 is located behind the protective barrier, in this case a wall 107, and is free to move vertically with respect to the surface of the magnetic tape media 1201 which is located within the tape cartridge 201. The construction of the magnetic tape 1201 and the tape cartridge 201 is well known in the art. The protective barrier is constructed to be as high as possible without interfering with the movement of the tape media 1201. Therefore the protective barrier is constructed to be slightly less than the height of the lower edge 1203 of the tape media. This hold true whether the protective barrier is a protective wall as shown or one or more protective pins.

In the three embodiments, the tape drive is constructed such that the tape cartridge is constrained in the vertical direction. That is, the tape cartridge is not free to move up or down within the tape drive. As such, the possibility of the tape cartridge moving over the read/write head protection barrier (wall, pin or pins) is eliminated.

While three preferred embodiments of the invention have been described, other embodiments of the invention will be apparent to those skilled in the art from a consideration of this specification or practice of the invention disclosed herein. For example, while round protection pins have been disclosed, square or other shaped protrusions can also be advantageously utilized. Also, instead of a single protection wall, a number of protection wall segments will achieve the desired results. Additionally, flat or other shaped metal tabs can be utilized which may be particularly advantageous if the bottom surface 103 is formed from flat metal sheet stock. Therefore it is intended that the specification and examples be considered as exemplary only, with the scope of the invention being defined by the following claims.

We claim:

1. A tape drive for a tape cartridge, the tape cartridge having a front surface and two end surfaces, each of the two end surfaces having at least a portion that is perpendicular to the front surface, the front surface having a cartridge opening for access to a magnetic tape and a door covering the cartridge opening, the tape drive comprising:

- a drive opening in the tape drive to receive the tape cartridge;
- the tape drive normally receiving the tape cartridge with the front surface passing through the drive opening first; a magnetic head contacting the magnetic tape through the cartridge opening;
- an opener opening the door during insertion of the tape cartridge into the tape drive;
- a physical barrier located near the magnetic head, the physical barrier positioned so that when the opener fails to completely open the door during insertion of the tape cartridge, the door contacts the physical barrier, the physical barrier prevents the door from opening, and the physical barrier prevents the door from making contact with the magnetic head; and the physical barrier positioned so that when the tape cartridge is inserted so that one of the end surfaces passes through the drive opening first, the tape cartridge contacts the physical barrier and the physical barrier prevents the tape cartridge from making contact with the magnetic head.

2. The tape drive of claim 1 further comprising:

a chassis; and the physical barrier comprising a wall on the chassis.

3. The tape drive of claim 2, the wall at least partially positioned between the magnetic head and the drive opening.

4. The tape drive of claim 3, the tape cartridge include a notch at the cartridge opening, the tape drive further comprising:

the wall positioned so that when the tape cartridge is fully inserted into a normal operating position, the wall is within the notch.

5. The tape drive of claim 1 further comprising:

a chassis; and the physical barrier comprising at least one pin inserted into the chassis.

\* \* \* \* \*